United States Patent
Gomi et al.

(10) Patent No.: US 6,676,109 B2
(45) Date of Patent: Jan. 13, 2004

(54) ROTARY VALVE

(75) Inventors: Chikashi Gomi, Yamanashi (JP); Masaru Takusagawa, Yamanashi (JP)

(73) Assignee: Kitz Corporation, Chiba-ken (JP)

( * ) Notice: Subject to any disclaimer, the term of this patent is extended or adjusted under 35 U.S.C. 154(b) by 0 days.

(21) Appl. No.: 10/412,585

(22) Filed: Apr. 14, 2003

(65) Prior Publication Data

US 2003/0178596 A1 Sep. 25, 2003

Related U.S. Application Data

(63) Continuation of application No. 09/861,547, filed on May 22, 2001.

(51) Int. Cl.⁷ .................................. F16K 1/22
(52) U.S. Cl. .................. 251/288; 292/293; 292/305
(58) Field of Search ............................... 251/305, 288, 251/292, 293, 286

(56) References Cited

U.S. PATENT DOCUMENTS

| | | |
|---|---|---|
| 2,111,998 A | 3/1938 | Stuckenholt et al. |
| 3,693,874 A | 9/1972 | Fox |
| 4,498,798 A | 2/1985 | Day |
| 4,660,592 A | 4/1987 | Williams |
| 5,314,165 A | 5/1994 | Raymond et al. |
| 5,490,660 A | 2/1996 | Kamezawa |
| 5,564,461 A | 10/1996 | Raymond et al. |
| 5,634,486 A | 6/1997 | Hatting et al. |
| 6,164,623 A | 12/2000 | Ito et al. |

FOREIGN PATENT DOCUMENTS

| | | |
|---|---|---|
| JP | 8-312795 | 11/1996 |
| JP | 2001-05414 | 2/2001 |

*Primary Examiner*—John Bastianelli
(74) *Attorney, Agent, or Firm*—Wenderoth, Lind & Ponack, L.L.P.

(57) ABSTRACT

A rotary valve includes a main valve body that includes a body, a seat disposed in the body and a valve body disposed in the body so that the valve body is rotatable through the seat that are modulated as a common component part. A stem pierces the body and imparts opening and closing motions to the valve body. An attaching-detaching part is disposed at a position at which the stem pierces the body. An operating part is disposed on the stem and is adapted to operate the valve body. A coupling part is detachably fastened at one end thereof to the attaching-detaching part and is mounted at the other end thereof on the operating part for joining the attaching-detaching part and the operating part.

2 Claims, 17 Drawing Sheets

ROTARY VALVE

This application is a continuation application of Ser. No. 09/861,547, filed May 22, 2001.

BACKGROUND OF THE INVENTION

1. Field of the Invention

This invention relates to a rotary valve, such as a butterfly valve, ball valve or cock valve, that is fitted to a pipe for passing a fluid, such as service water, hot water, cold water, cooling water or air, to an air conditioning device, plaint device or factory device. More particularly, the invention relates to a rotary valve having a main valve body modulated as a common component, thereby adapting other component parts of various types for attachment to and detachment from the main valve body and giving rise to any one of various valves.

2. Description of the Prior Art

FIG. 24 is a front view illustrating one example of the ordinary butterfly valve that is in popular use among other rotary valves. This butterfly valve comprises a cylindrical body 1, a rubber seat ring 2 disposed in the body 1, a disk 3 disposed in the seat ring 2 so as to rotate therein with a stem and produce opening and closing motions. The stem is disposed in a long shaft cylinder 4 projecting in the body 1. A lever-operating device 6 (or a gear-operating device or an electric, pneumatic or hydraulic actuator) is fastened with a bolt 7 and a nut 8 onto a flange 5 formed at the upper end of the shaft cylinder 4. This butterfly valve is a long neck one that particularly conforms to the need for coating with a heat insulating material or the need for other piping. A short neck butterfly valve having a short shaft cylinder is also available. The butterfly valves of these kinds are completed in their entirety by incorporating pertinent components parts therein. The valve products finished in conformity to individual applications are delivered to the market.

One of the inventors of the present invention proposed a non-neck butterfly valve as a version with a low frequency of producing opening and closing motions in actual use (JP-A08-312795).

Thus, the conventional butterfly valves have been completed as products of individual types, i.e. various valves conforming to the needs for pipes and the environment of installation, to satisfy the users' demands.

By the necessity for conforming to varying market demands, therefore, the number of parts has been naturally increasing and further, the demands for storage and management of parts have been growing so as to entail additional cost. Even from the viewpoint of saving resources and respecting economy, the desirability of developing a rotary valve, such as a butterfly valve, having fulfilled such tasks has been finding growing recognition.

As shown in FIG. 24, the lever-operating device 6 mounted on the rotary valve, for example, is fastened to the flange 5 with the bolt 7 and nut 8. In this case, a clearance will exist between the inside diameter of a hole 5a (FIG. 25) of the flange 5 and the outside diameter of the bolt 7.

For this reason, the butterfly valve, on generating a twist or a rotational torque, causes its position to deviate in a size proportionate to the clearance and loosen the bolt 7. In the rotary valve of this structure, if the component members are coupled with bolts, they will possibly give rise to a slight deviation and particularly degrade the accuracy of the position for closing the valve body.

With a view to solving the conventional problems, one object of the present invention is to a rotary valve having a main valve body modulated as a common component part. This allows parts other than the main valve body to be exchanged in conformity with the need for pipes and the environment of installation, with the main body part mounted on the pipe. As a. result, it is possible to attain a reduction in cost, improve the economy exceptionally and consequently enhance the work execution property. This further exalts the accuracy of closure of the valve by infallibly coupling such other parts with the main body part without possibly inducing any deviation of the sites of connection.

To attain the above object, the present invention provides a rotary valve that comprises a main valve body that includes a body, a seat disposed in the body and a valve body disposed in the body so that the valve body is rotatable through the seat, and that is modulated as a common component part; a stem piercing the body and imparting opening and closing motions to the valve body; an attaching-detaching part disposed at a position at which the stem pierces the body; an operating part disposed on the stem and adapted to operate the valve body; and a coupling part detachably fastened at one end thereof to the attaching-detaching part and mounted at the other end thereof on the operating part for joining the attaching-detaching part and the operating part.

The above and other objects, feature and advantages of the present invention will become apparent from the detailed description of the invention to be given herein below with reference to the accompanying drawings.

DETAILED DESCRIPTION OF THE PREFERRED EMBODIMENTS

The concept of the rotary valve in this invention can be applied to butterfly valves, ball valves, and cock valves. This invention will be described specifically below with reference to the embodiments applied to the butterfly valve as illustrated in the accompanying drawings.

Figure 1:
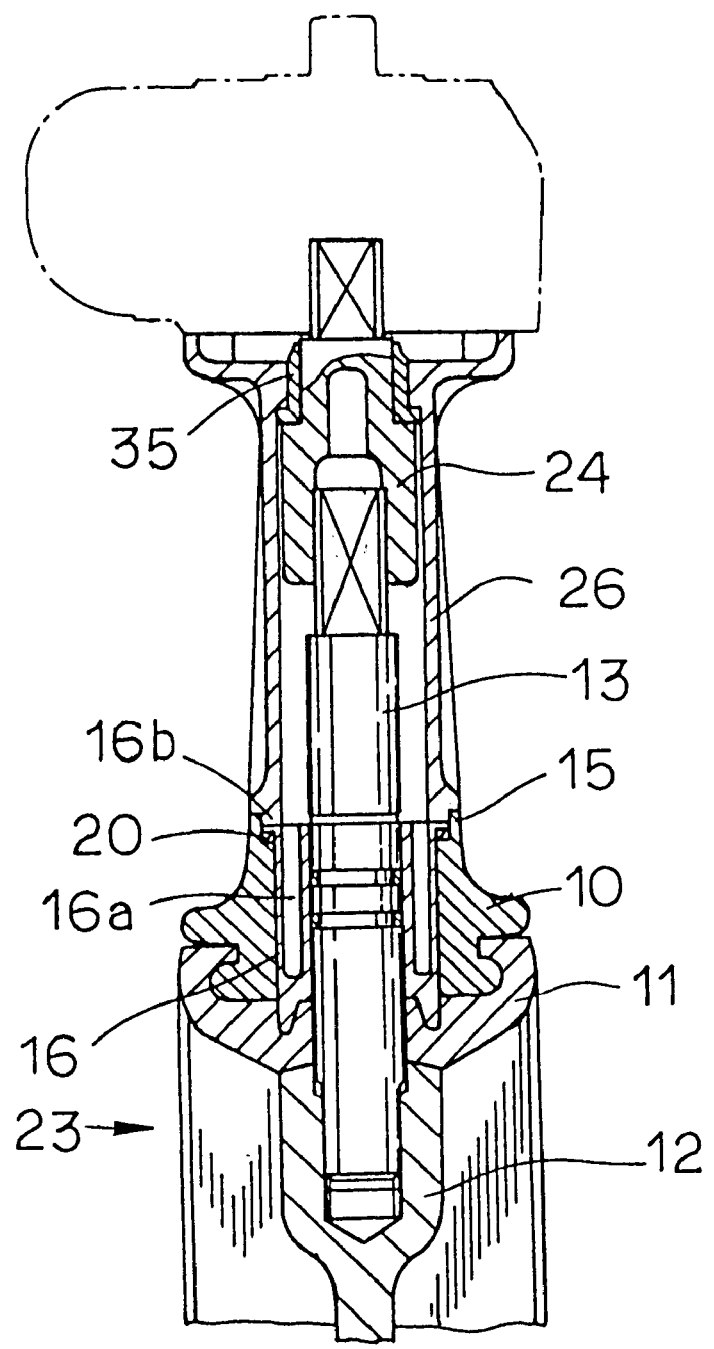
FIG. 1 is a partially cutaway, longitudinal cross section illustrating one embodiment of a long neck butterfly valve in the rotary valves of various types contemplated by this invention.
Figure 3:
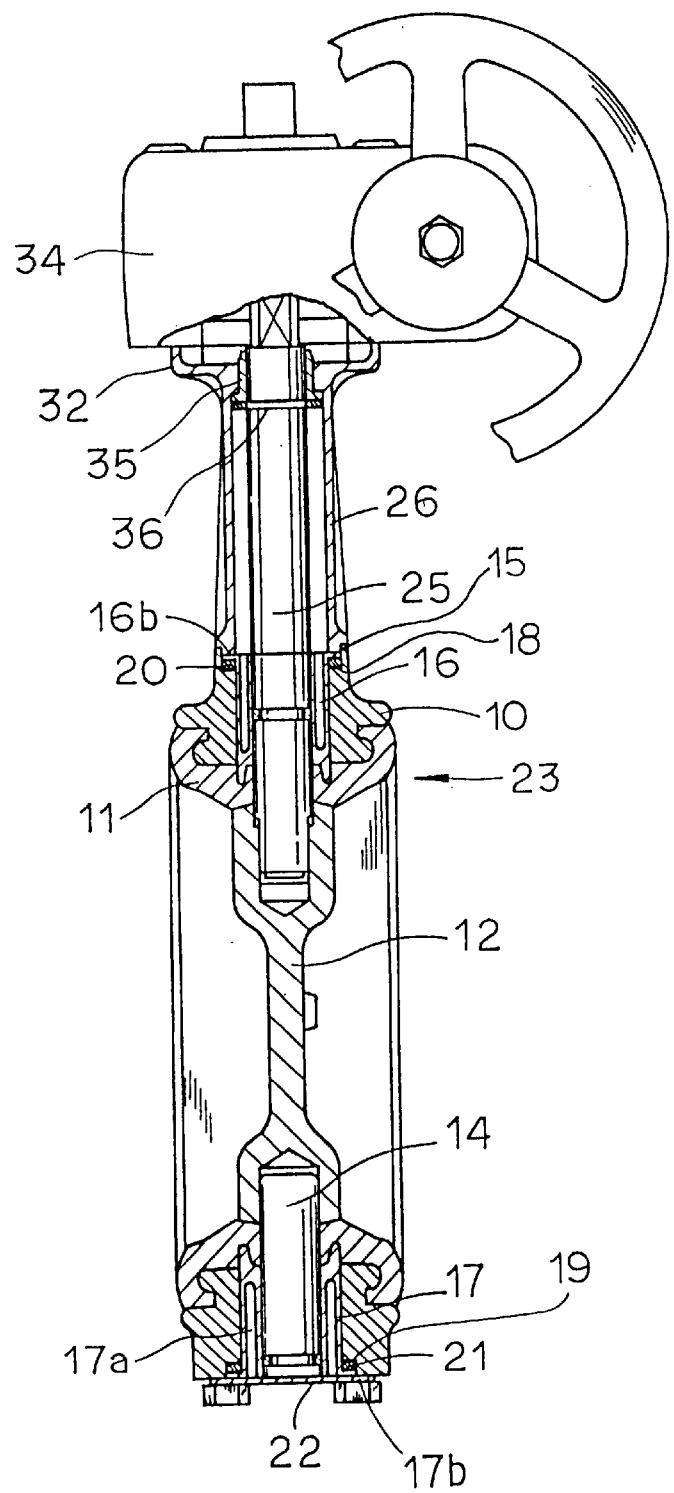
FIG. 3 is a longitudinal cross-sectional view illustrating another embodiment of the butterfly valve according to the present invention.
Figure 4:
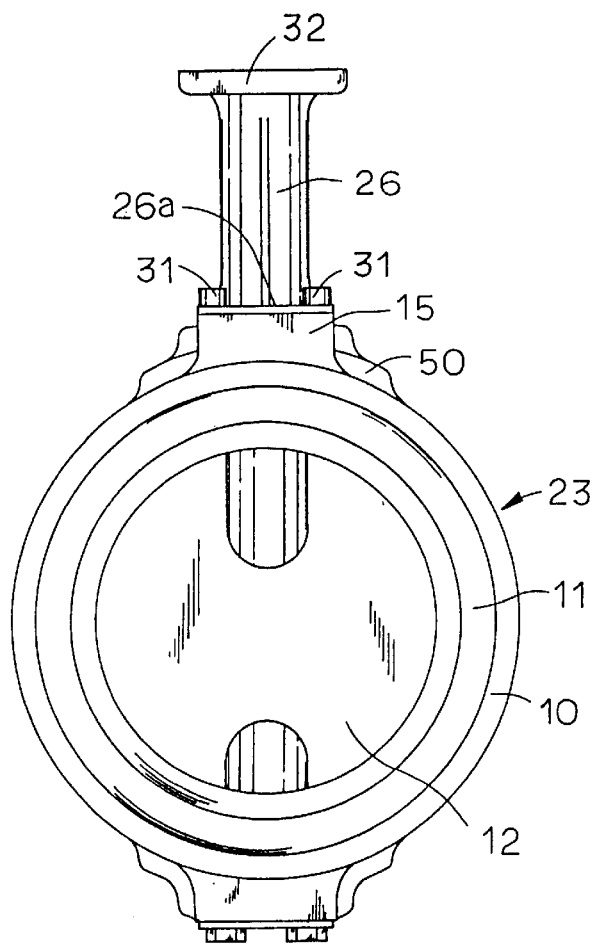
FIG. 4 is a front view illustrating the butterfly valve of FIG. 3.
Figure 5:
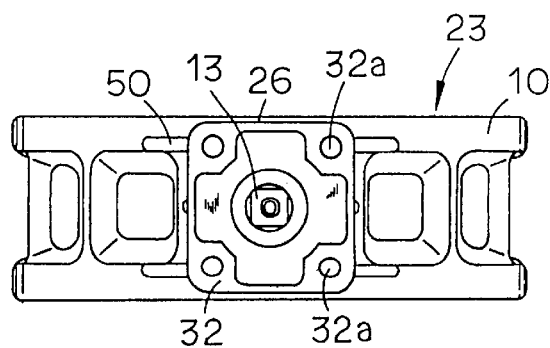
FIG. 5 is a plan view of what is illustrated in FIG. 4.

With reference to FIG. 1 and FIG. 3, an annular seat 11 formed of a flexible material, such as rubber or resin, is mounted on the inner periphery of a cylindrical body 10. A circular disk (valve body) 12 rotating on the inner peripheral surface of the seat 11 is adapted to open and close the flow path. Reference numerals 13 and 14 respectively represent an upper stem and a lower stem. A slightly projected attaching-detaching part 15 is formed at the position at which the upper stem 13 pierces the cylindrical body 10. The cylindrical body 10 formed with the attaching-detaching part 15 is produced by die-casting an aluminum alloy with a view to lessening weight. Resin cylindrical bearings 16 and 17 furnished respectively with annular empty spaces 16a and 17a are set around the outer peripheries of the upper and lower stems 13 and 14. An O ring 20 is set between a bent part 16b formed in the outer end part of the bearing 16 and a groove 18 formed in the attaching-detaching part 15. An O ring 21 is set between a bent part 17b formed in the outer end part of the bearing 17 and a groove 19 formed in the cylindrical body 10. The lower stem 14 is covered with an end plate 22 as illustrated in FIG. 3. These bearings 16 and 17 are aimed at preventing the upper and lower stems 13 and 14 from producing a biting motion and diminishing the operating torque of each of the upper and lower stems 13 and 14. The bent parts 16b and 17b, on being inserted into the grooves 18 and 19, can manifest the function of centering the upper and the lower stem 13 and 14 when these stems are set in place on the bearings 16 and 17.

Figure 23:
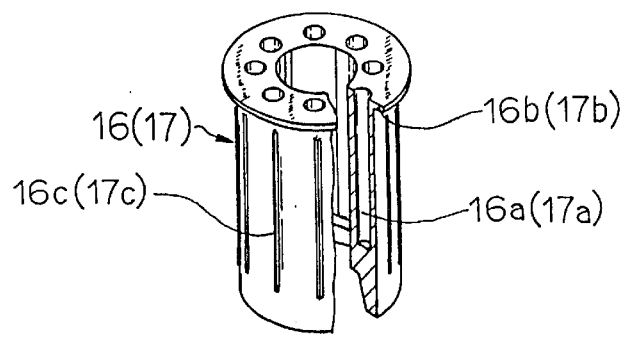
FIG. 23 is a partially cutaway, perspective view of a cylindrical bearing.
Figure 24:
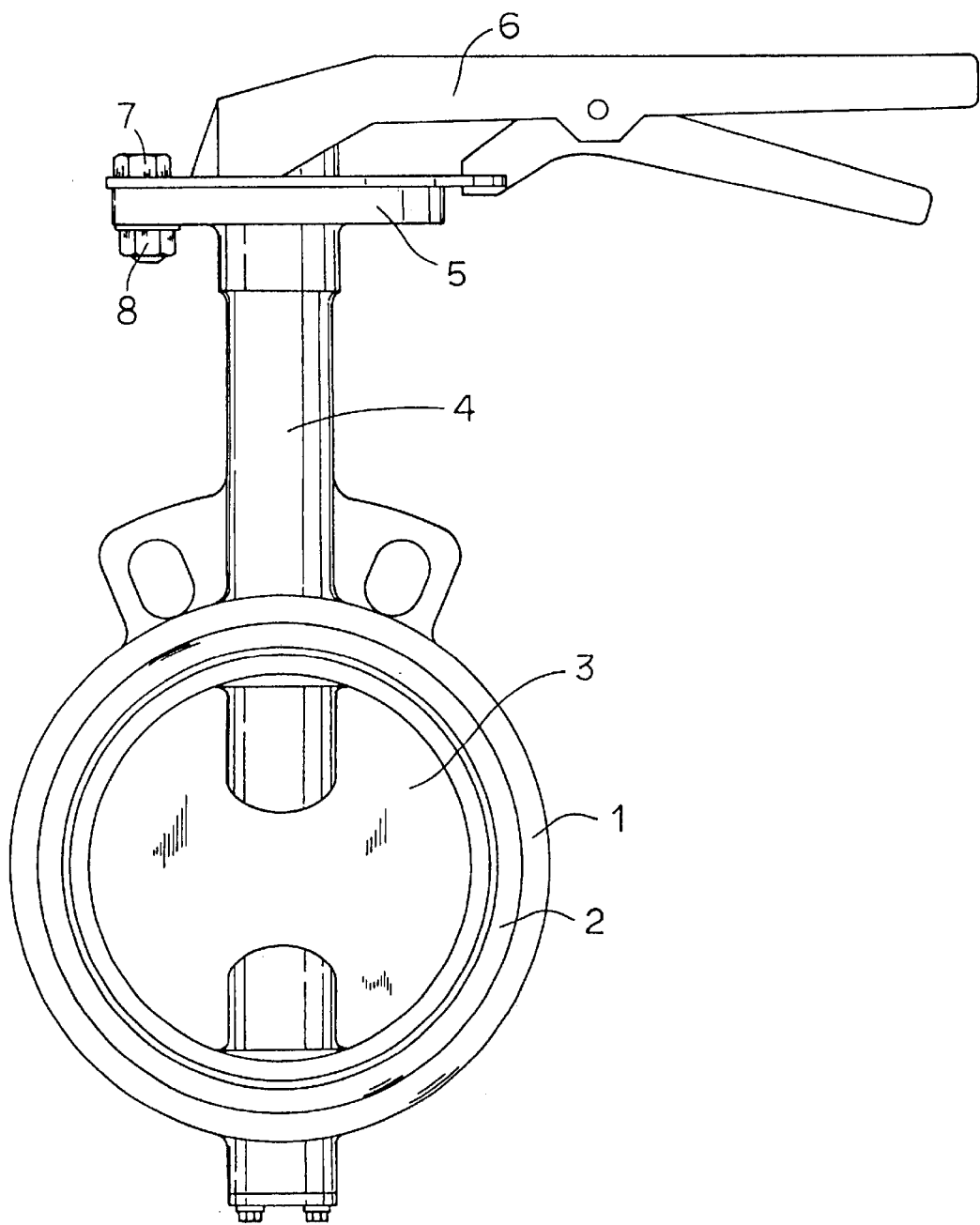
FIG. 24 is a front view illustrating one example of the conventional butterfly valve.
Figure 25:
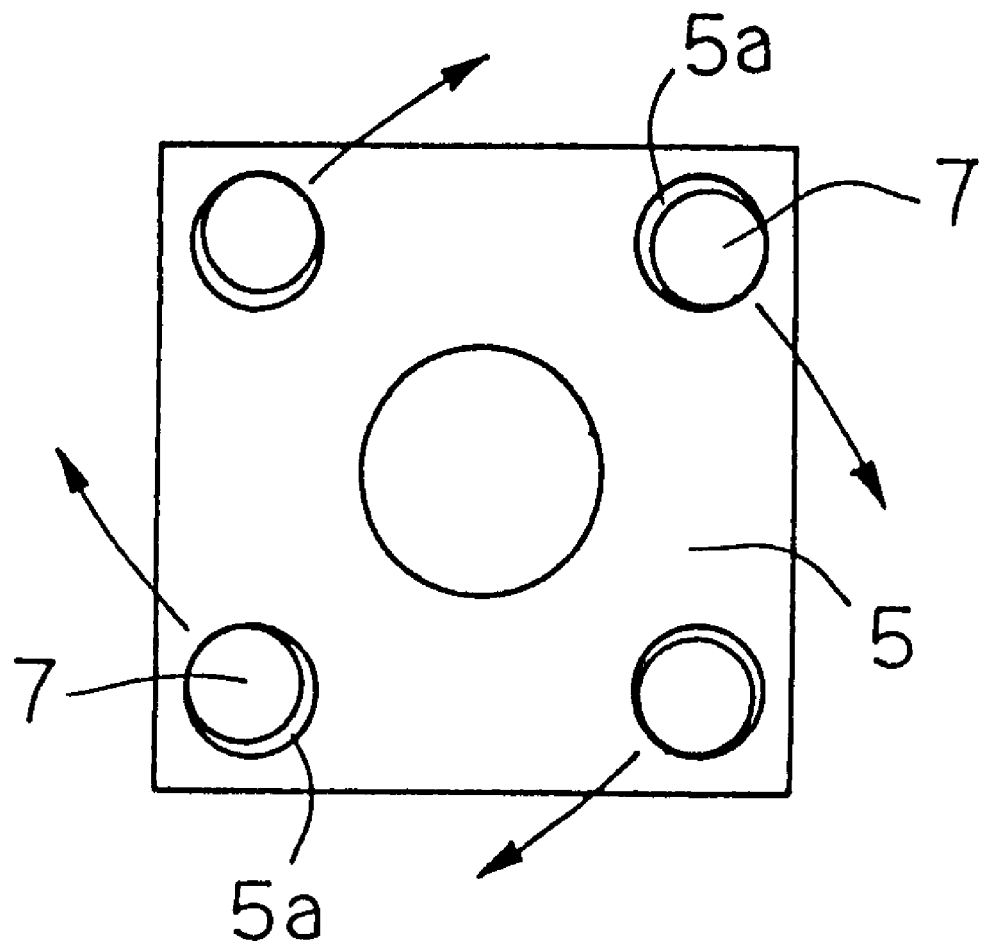
FIG. 25 is an explanatory diagram depicting one example of a coupling part of the conventional butterfly valve.

As illustrated in FIG. 23, ribs 16c and 17c may be projected at a prescribed distance from the outer peripheries in the cylindrical sites of the bearings 16 and 17 and these ribs 16c and 17c are enabled to prevent the bearings 16 and 17 from rotating after they are seated.

A main valve body 23 is a common component part comprising the body 10, seat 11, disk 12, upper and the lower stem 13 and 14, and bearing 16 and 17 serving the purpose of sealing the stems. When used as a long neck valve as illustrated in FIGS. 1 and 6, an extended shaft 24 made of a metallic material is mounted nonrotatably on the upper end of the upper stem 13 to form a long neck upper stem.

Figure 6:
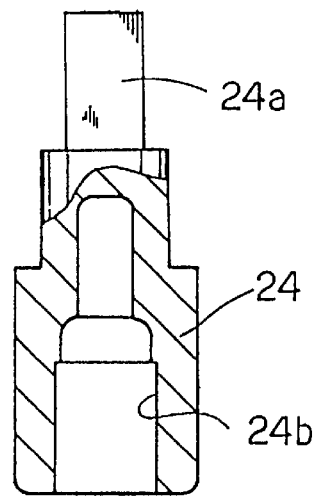
FIG. 6 is a partially cutaway, magnified cross section illustrating an extended shaft for use in the butterfly valve illustrated in FIG. 3.

As illustrated in FIG. 6, the extended shaft 24 has an angular shaft 24a in the upper part and a circular shaft in the intermediate and lower parts. A hole 24b in the lower part is identical in shape with the upper end of the upper stem 13 and has the function of a junction in a vertical direction.

A long neck butterfly valve which does not use the upper stem 13 as a common component part obviates the necessity for using the upper stem 13 and extended shaft 24 and relies on the use of a correspondingly long stem 25 as illustrated in FIG. 3. The choice between the upper stem 13 and the long stem 25 is appropriately determined, depending on the actual production.

Figure 7:
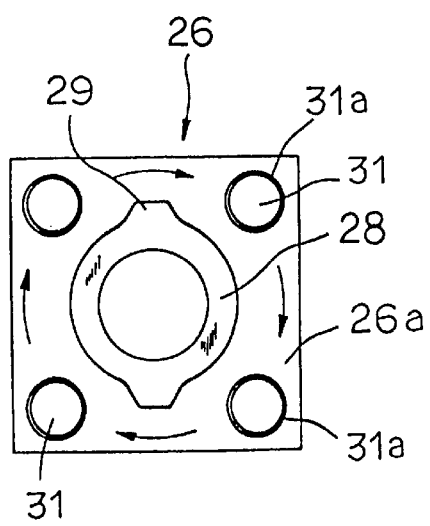
FIG. 7 is an explanatory diagram illustrating the lower surface of the coupling part and depicting the state in which the coupling part is fastened to an attaching-detaching part for baffling rotation in the butterfly valve of FIG. 1.
Figure 8:
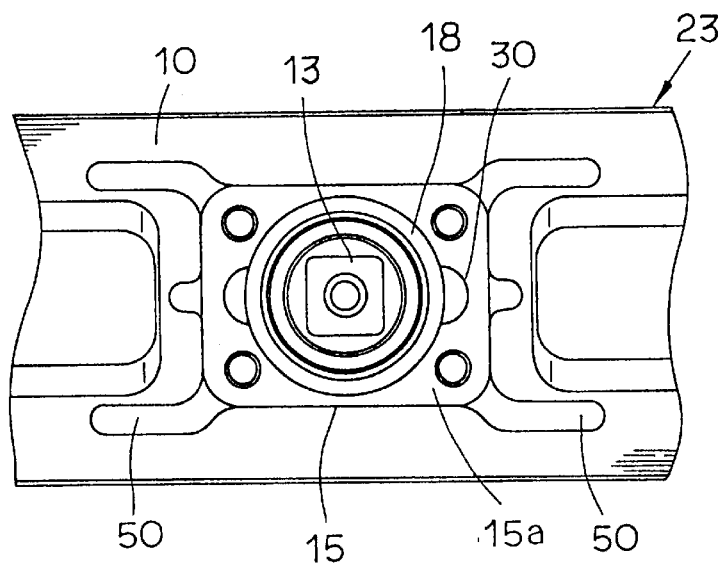
FIG. 8 is a partially cutaway, magnified plan view illustrating the main valve body of the butterfly valve of FIG. 1 in the state assumed after the coupling part is removed from the butterfly valve.
Figure 11:
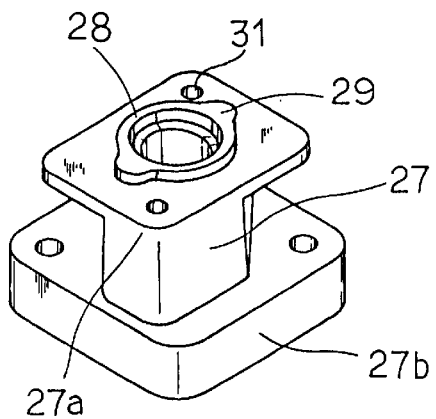
FIG. 11 is a perspective view illustrating a coupling part of FIG. 9 in an inverted state.

The coupling part made of a metallic material falls under two types, i.e. a long cylindrical coupling part 26 for a long neck valve and a short cylindrical coupling part 27 for a short neck valve. In the lower end parts 26a and 27a of the coupling parts 26 and 27, an annular projected part 28 for fitting and an engaging projected part 29 for baffling rotation are formed as illustrated in FIGS. 7 and 11. The projected part 28 is fitted in the groove 18 and the engaging projected part 29 is joined to an engaging depressed part 30 continued into the groove 18 so as to baffle the force tending to rotate the part 29.

Figure 12:
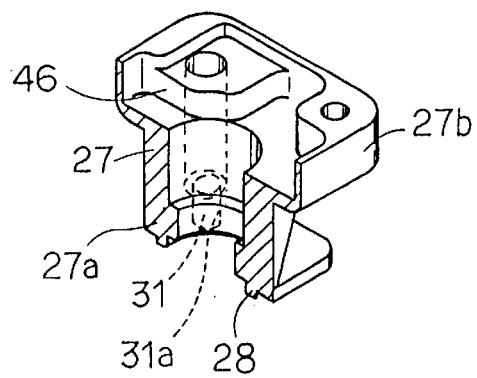
FIG. 12 is a partially cutaway, perspective view illustrating one half of the coupling part in the butterfly valve of FIG. 9.
Figure 13:
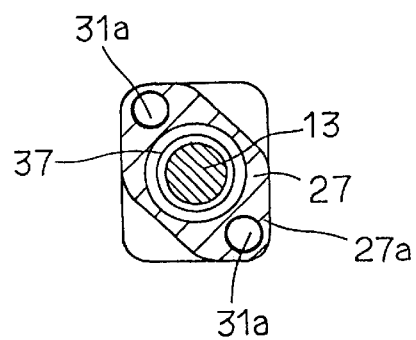
FIG. 13 is a cross section taken across FIG. 9 along line XIII—XIII.

Incidentally, these depressed and projected parts may assume any shape at all so long as the shapes are capable of producing a baffled mutual fitting. For example, a depression may be imparted to the coupling parts 26 and 27 and a projection may be imparted to the attaching-detaching part 15. Otherwise, these parts may be formed so as to give polygonal depressions and projections to themselves at the coupling and baffling regions thereof Further, the flange-shaped lower end part 26a of the coupling part 26 has four bolts 31 fastened to four female screws 15b on a fitting surface 15a of the attaching-detaching part 15. The lower end part 27a of the coupling part 27 has, as shown in FIG. 12, two hexagon socket bolts 31 fastened to the female screws 15b on the fitting surface 15a of the attaching-detaching part 15 through threaded holes 31a.

Figure 2:
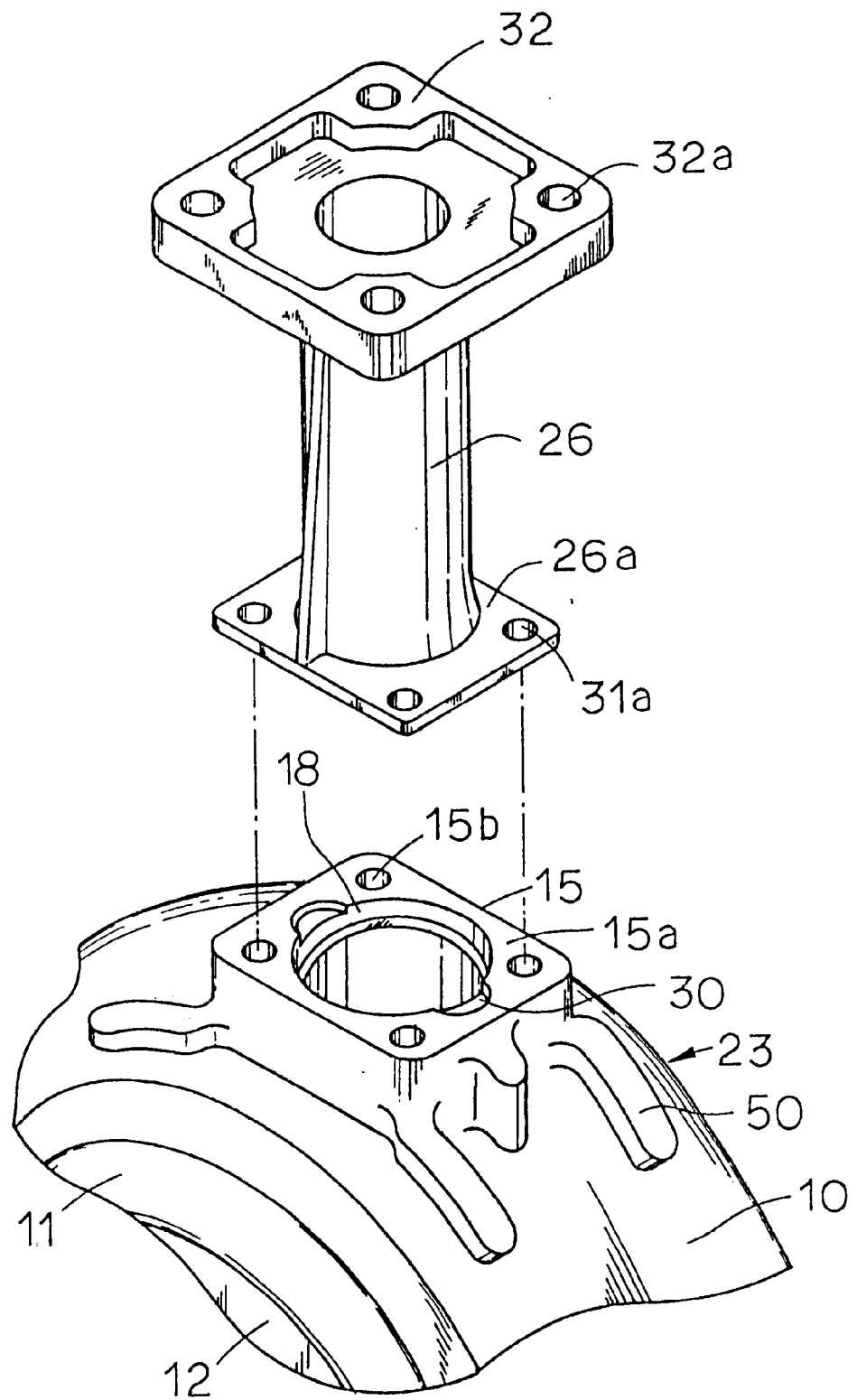
FIG. 2 is a partially cutaway, magnified perspective view illustrating the butterfly valve of FIG. 1 in the state having its main valve body and a long neck grade coupling part separated.

Then, the long coupling part 26 is provided at the upper end thereof with a flange-shaped mounting part 32 as illustrated in FIG. 2. This mounting part 32 is furnished with through holes 32a and adapted to mount thereon a gear operating device, a lever operating device, or an electric, pneumatic or hydraulic operating part through bolts and nuts. A stem grade bearing 35 is fitted to the long stem 25 or the extended shaft 24 on the upper stem 13. A split ring 36 fitted on the long stem 25 is engaged with the lower end part of the bearing 35 fastened to one part of the inner side of the coupling part 26 with a view to preventing the stems from popping out.

Figure 9:
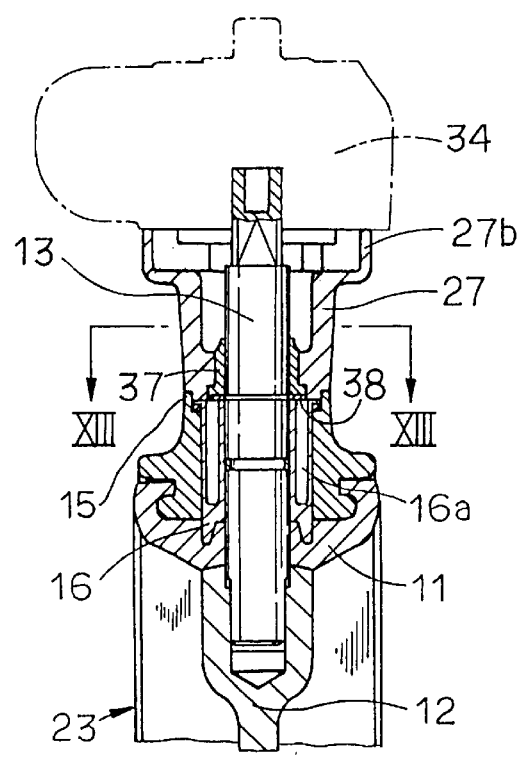
FIG. 9 is a partially cutaway, longitudinal cross section illustrating a short neck butterfly valve contemplated by this invention.
Figure 18:
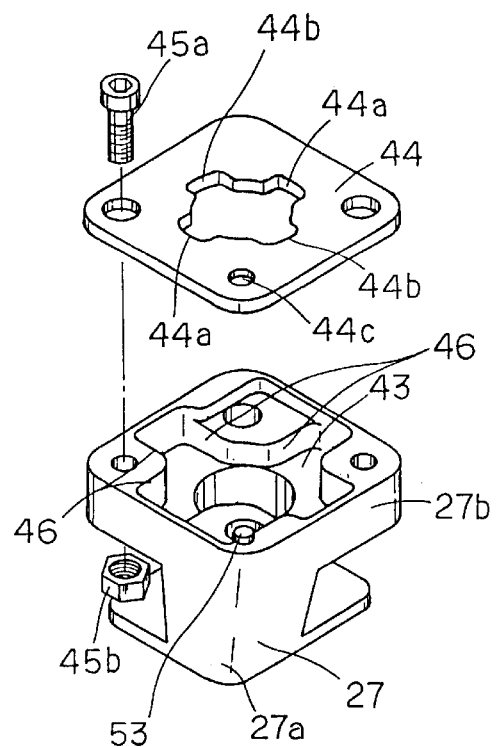
FIG. 18 is a separated perspective view of a coupling part shown in FIG. 14.

The operating device 34 is mounted through a bolt and a nut also to the flangeshaped mounting part 27b at the upper end of the short coupling part 27 as illustrated in FIG. 9. Then, a stem grade bearing 37 is fitted to the upper stem 13. The lower end of the bearing 37 is joined to the inner part of the coupling part 27. A split ring 38 is fitted to the upper stem 13 and joined to the lower end part of the bearing 37 to prevent the upper stem 13 from popping out. The operating device 34 or an engaging plate 44 (FIG. 18) is mounted to the mounting part 27b the coupling part 27 at two diagonal points, and the body 10 is fixed thereto at the other two diagonal points. The diameter of the bottom part of the bolt insertion hole is decreased, and the thickness of the decreased diameter part is equalized with the thickness of the part of this decreased diameter with the thickness of the flange-shaped lower end part 26a of the long coupling part 26. By this, the bolt 31 is adapted to form a common component part In the case of the non-neck type illustrated in FIG. 14, the coupling part 27 is provided therein with a spring 39. The upper stem 13 is fitted to a non-circular part 40a of the operating part 40 upwardly urged by this spring 39 and is fastened thereto non-rotatably with a setscrew 41. This operating part 40 has formed therein an engaging protected part 40b serving the purpose of locking the operating part 40 when it is wholly opened or wholly closed. In the upper part of the coupling part 27, there are formed an angular part 40d, a depressing surface part 40e, an opening degree display part 40f, and a positioning projected part 40g. A tool 42, such as a wrench, is fitted to the angular part 40d to produce a rotary operation. The depressing surface part 40c is adapted to impart a depression with the tool 42. The positioning projected part 40g is adapted to be fitted into a penetrating hole 44d of the engaging plate 44.

An empty space 43 for enabling the operating part 40 to be vertically moved and adapted to rotate in conjunction with the upper stem 13 is formed in the coupling part 27. The coupling part 27 is provided with the engaging plate 44 having engaging grooves 44a and 44b that is adapted to be locked with the engaging projected part 40b of the operating part 40. The engaging grooves 44a and 44b in the present case are spaced with an angular interval of about 90°. These engaging grooves 44a and 44b fasten the engaging plates 44 on the upper surface of the coupling part 27 with a bolt 45a and a nut 45b. The engaging plate 44 is positioned and fastened to the mounting part 27b by inserting into the through hole 44c of the engaging plate 44 the projected part 53 disposed in the mounting part 27b.

In the empty space 43 is formed a stopper part 46 for forming a region in which the operating part 40 is rotated at an angular interval of 90°, for example.

Figure 16:
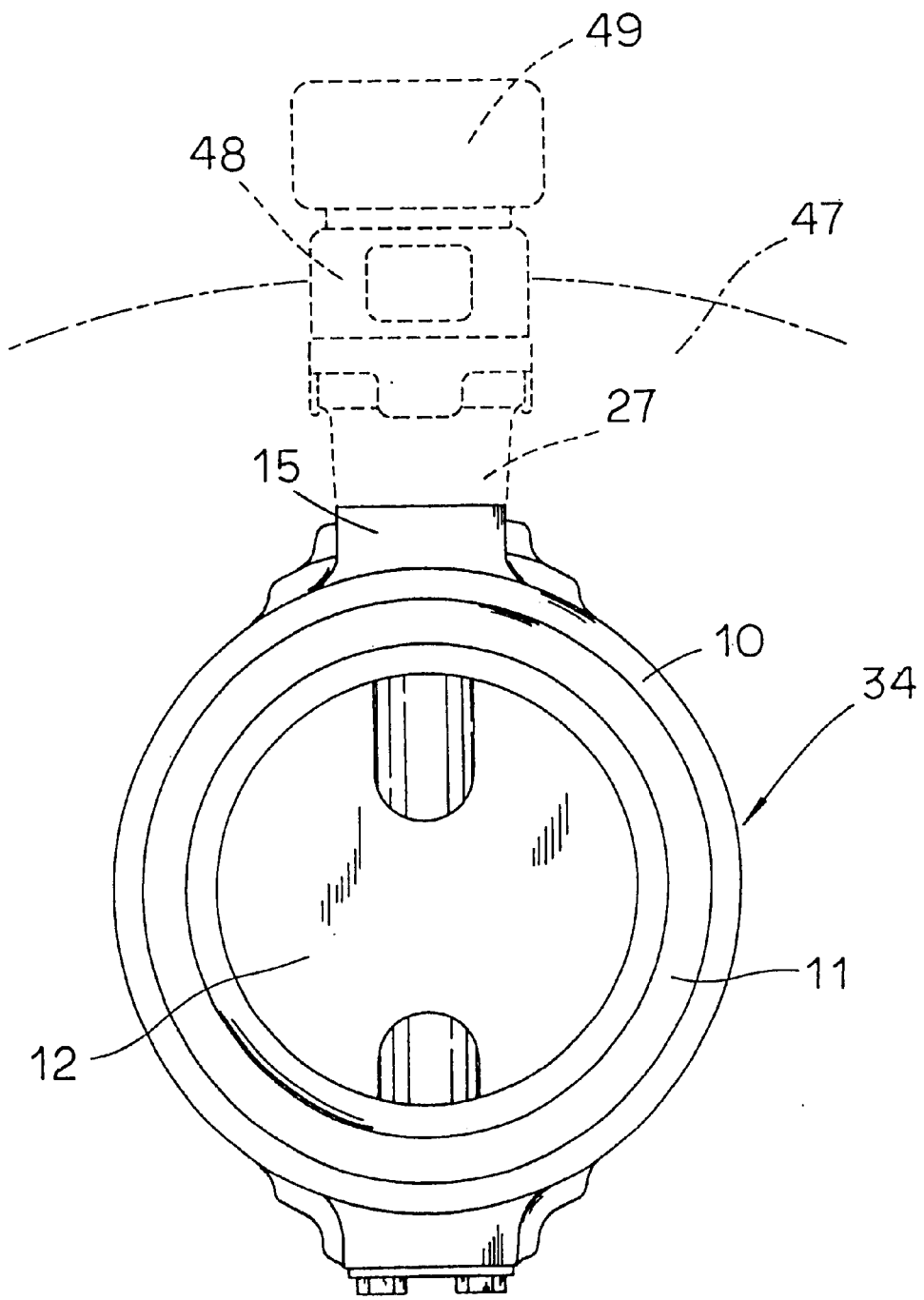
FIG. 16 is a front view illustrating the butterfly valve of FIG. 14.

Further, when the rotary valve is a non-neck version and necessitates a measure against formation of dew as by supplying cold or hot water to an air conditioning device, it is coated with a heat insulating material 47 as illustrated in FIG. 16. In this case, a cover 48 for preventing infiltration of the heat insulating material 47 is fitted in the upper part of the coupling part 27. In addition, an opening degree displaying member 49 is fitted in the cover 48 with a view to tightly sealing the interior of the cover 48.

Incidentally, when the fluid to be handled is air, oil or gas, for example, the rotary valve no longer needs to coated with the heat insulating material 47. In this case, the degree of opening of the valve van be confirmed at the opening degree display part 40f of the operating part 40.

Figure 10:
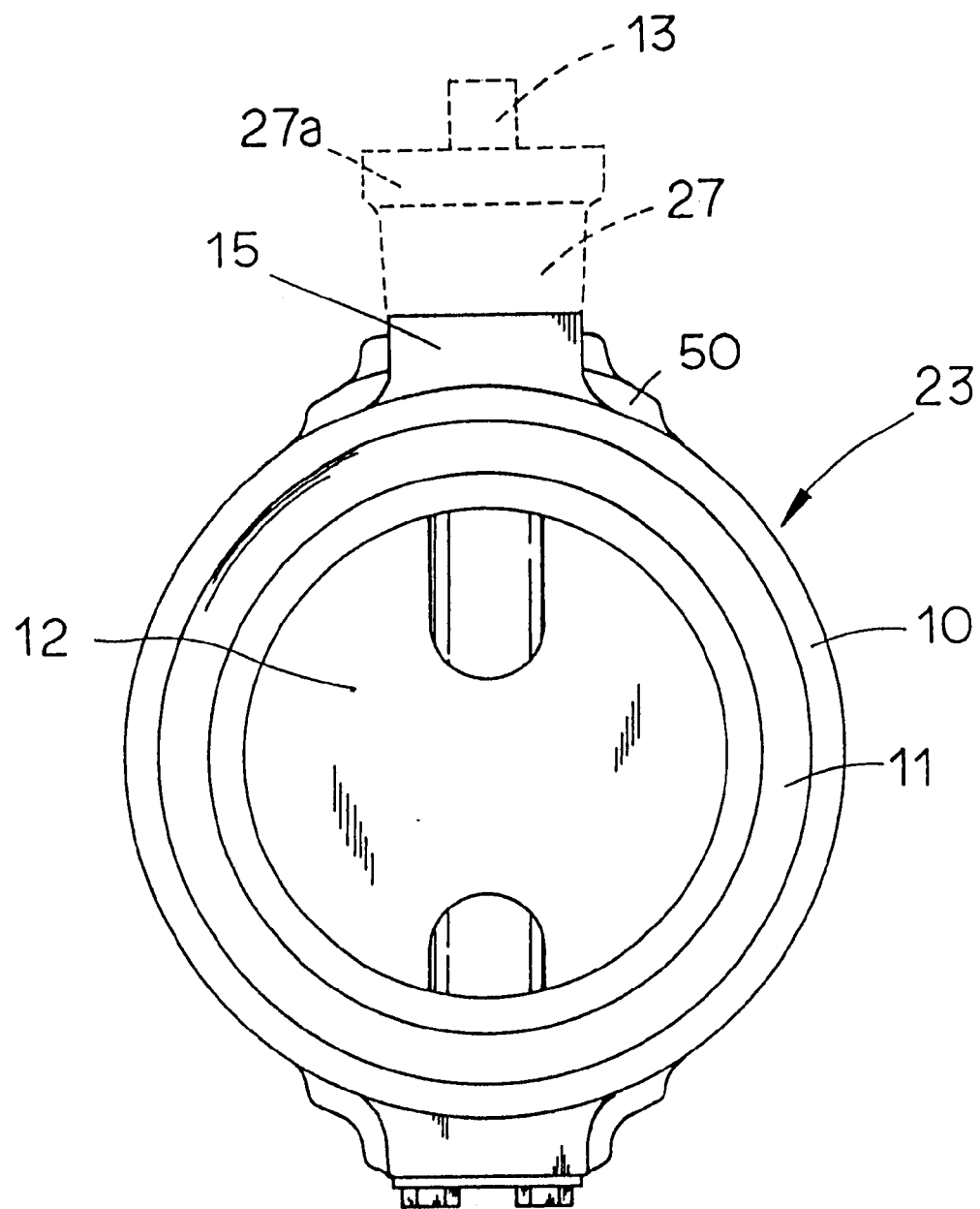
FIG. 10 is a front view illustrating the butterfly valve of FIG. 9.
Figure 17:
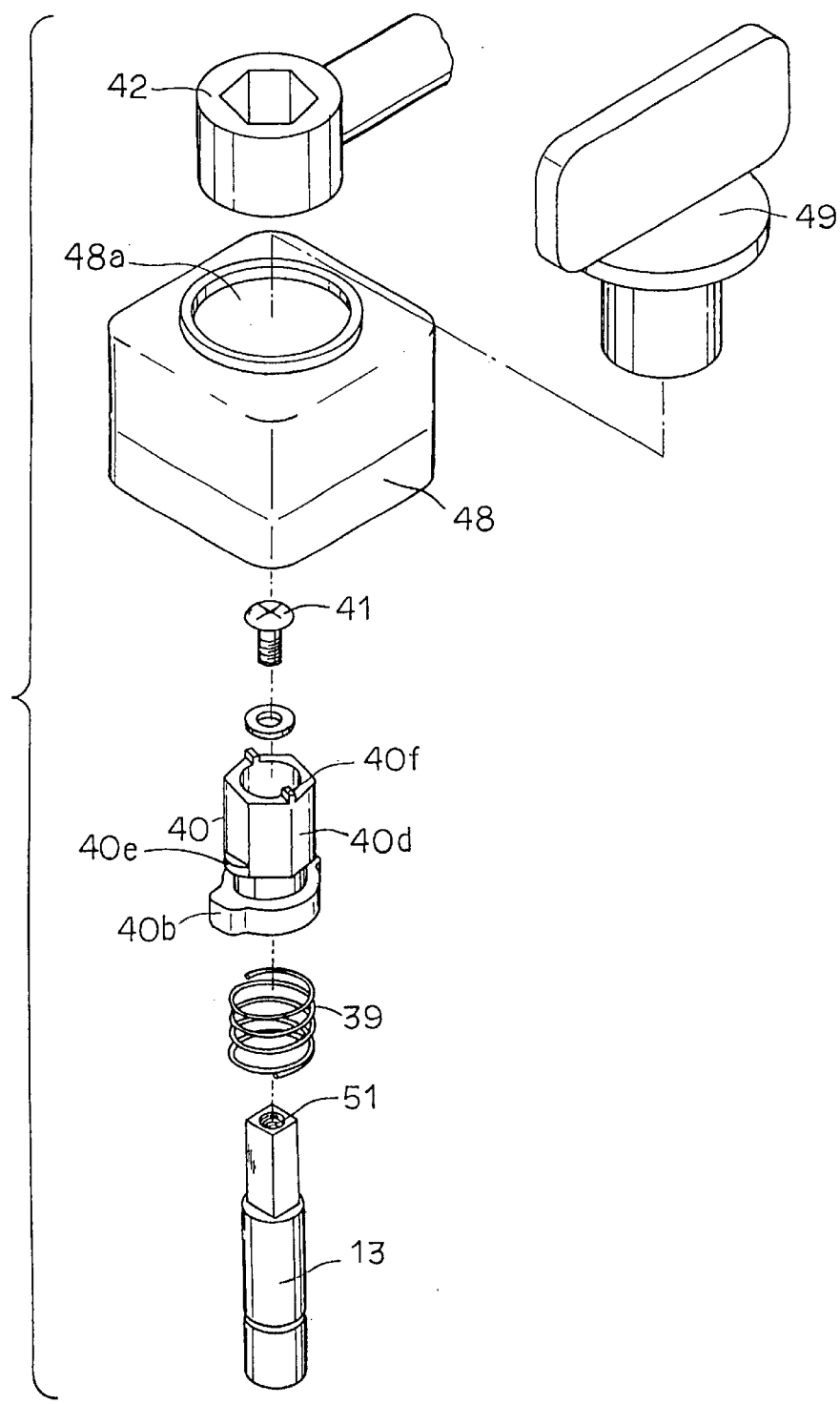
FIG. 17 is a separated perspective view illustrating an operating part shown in FIG. 14.

Reference numeral 50 in FIG. 10 represents a centering guide part to be used in fitting a pipe to the main valve body 23 and reference numeral 51 in FIG. 17 represents a female screw formed at the upper end of the stem.

Figure 19:
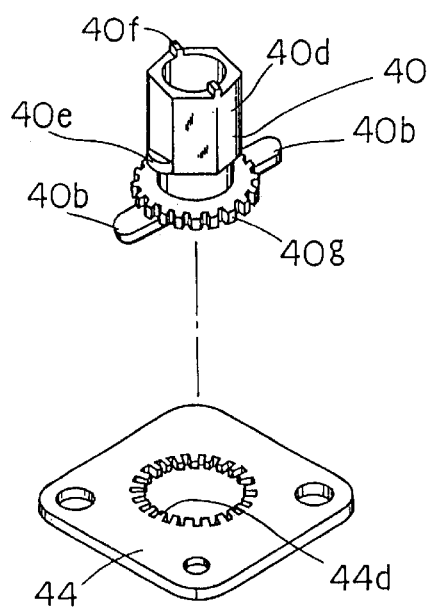
FIG. 19 is a separated perspective view illustrating another example of the operating part and an engaging part shown in FIG. 14.

FIG. 19 illustrates another example of the non-neck version of the valve. This example is a modification of the example illustrated in FIG. 14. With reference to FIG. 19, a toothed wheel part 40g having teeth raised from the entire periphery is formed in the lower part of the operating part 40. An engaging projected part 40b having a rotation thereof regulated over an angle of 90° by a stopper part 46 is disposed on the lower surface of the toothed wheel part 40g. This toothed wheel part 40g is meshed with the teeth of the engaging part 44d of the shape of a toothed wheel of the engaging plate 44 by the snap action of the spring 39. This engagement is broken and the restriction of the rotation over the angle of about 90° is relieved by the depression exerted on the operating part 40. The toothed wheel part 40g, therefore, is adapted so as to be locked at the positions of intermediate stop, full open and full closure by the pitches of the teeth in the range 90°.

Figure 14:
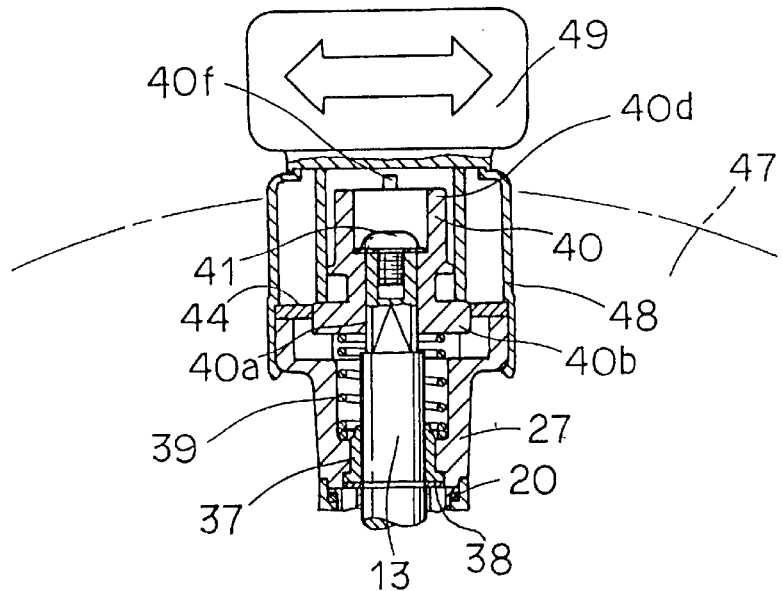
FIG. 14 is a partially cutaway, longitudinal cross section illustrating a non-neck butterfly valve contemplated by this invention.
Figure 15:
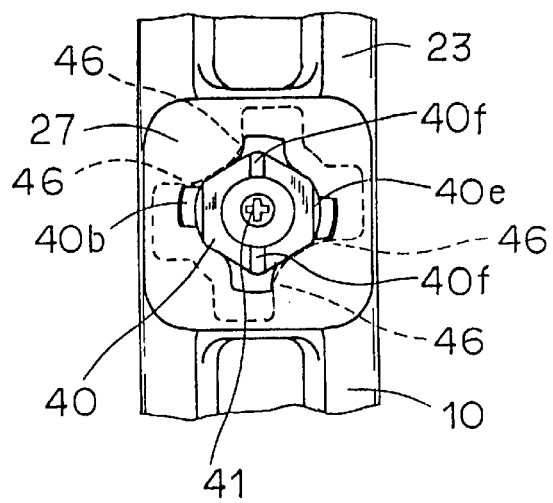
FIG. 15 is a partially cutaway, plan view illustrating the butterfly valve of FIG. 14 in a state having a cover and an opening degree displaying member removed.
Figure 20:
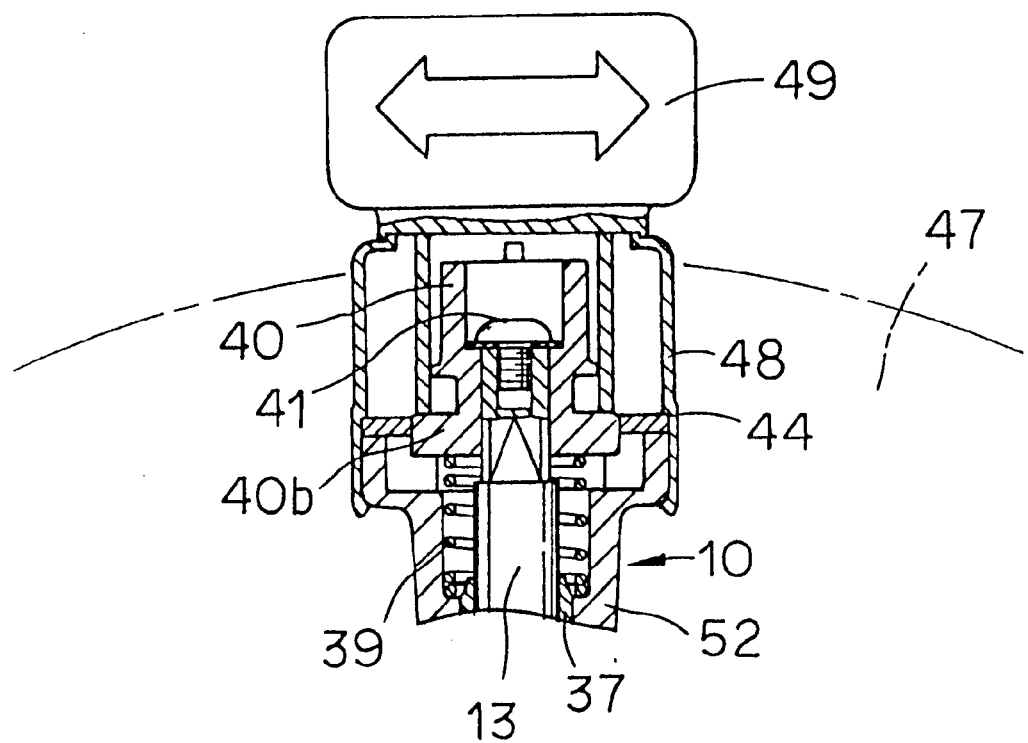
FIG. 20 is a partially cutaway, longitudinal cross section illustrating another embodiment of the non-neck butterfly valve according to this invention.
Figure 21:
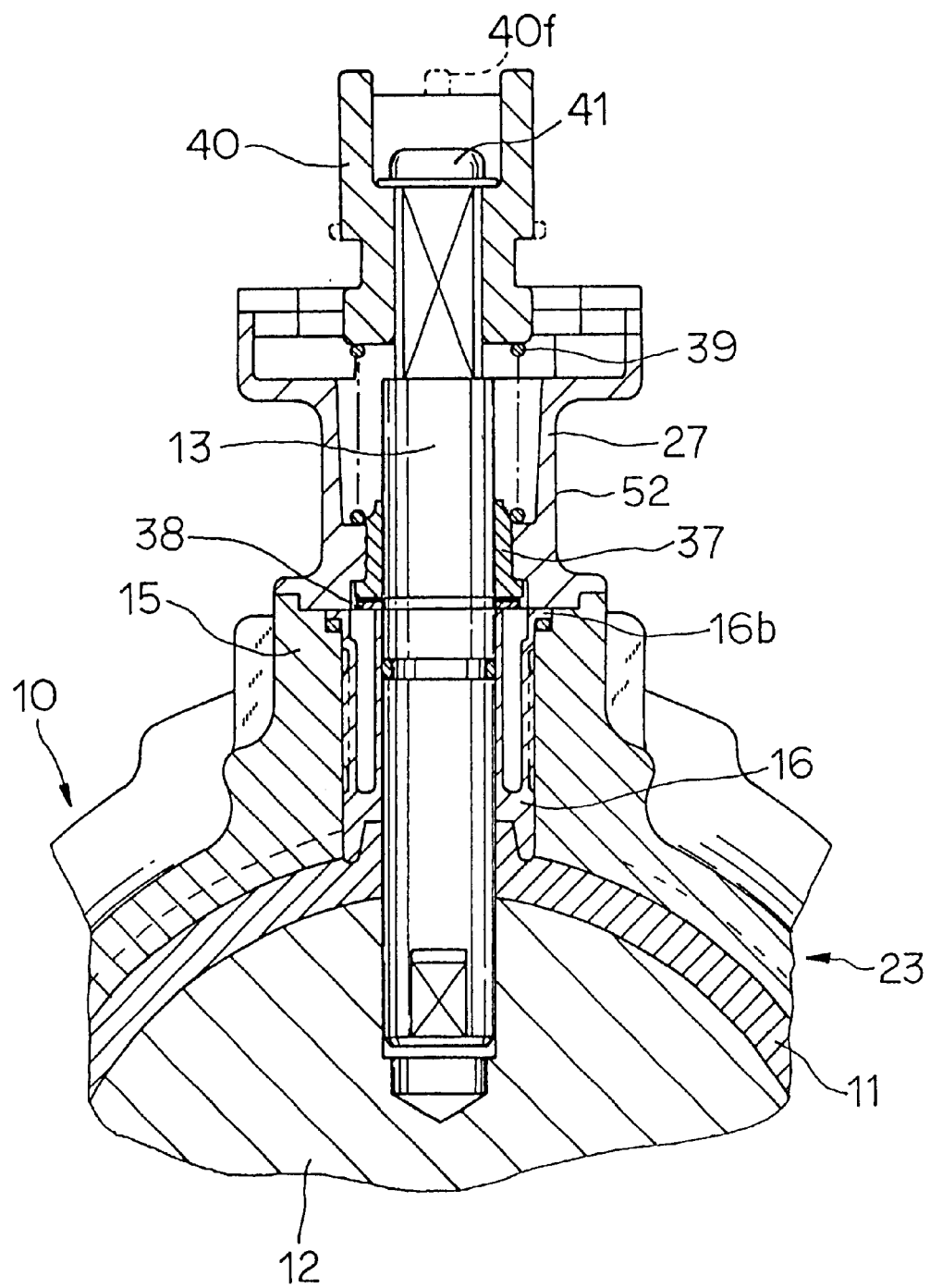
FIG. 21 is a partially cutaway, longitudinal cross section illustrating yet another embodiment of the non-neck butterfly valve according to this invention.

FIGS. 20 and 21 illustrate part of the butterfly valve as another embodiment of this invention. In these diagrams, like parts found in FIG. 14 are denoted by like reference numerals. In the embodiment illustrated in these diagrams, a shaft cylinder part 52 is integrally formed on the body 10 and this shaft cylinder part 52 is provided with the operating part 40.

The disk 12 is rotatably disposed through the seat 11 disposed in the cylindrically shaped body 10. The upper stem 13 connected to the disk 12 is axially mounted on the shaft cylinder part 52 formed on the body 10. In the shaft cylinder part 52, the operating part 40 fastened to the upper end of the stem 13 is snapped and left producing a free vertical motion through the spring 39. The empty space 43 adapted to rotate the operating part 40 in conjunction with the stem 13 is disposed in the shaft cylinder part 52. The empty space 43 is provided with the stopper part 46 adapted to form the region for regulating the rotation of the operating part 40 and the engaging part 44 for locking the operating part 40 at positions for full open, full closure or intermediate open in the ascending direction. The rotary valve in this mode is constructed as described above.

Figure 22:
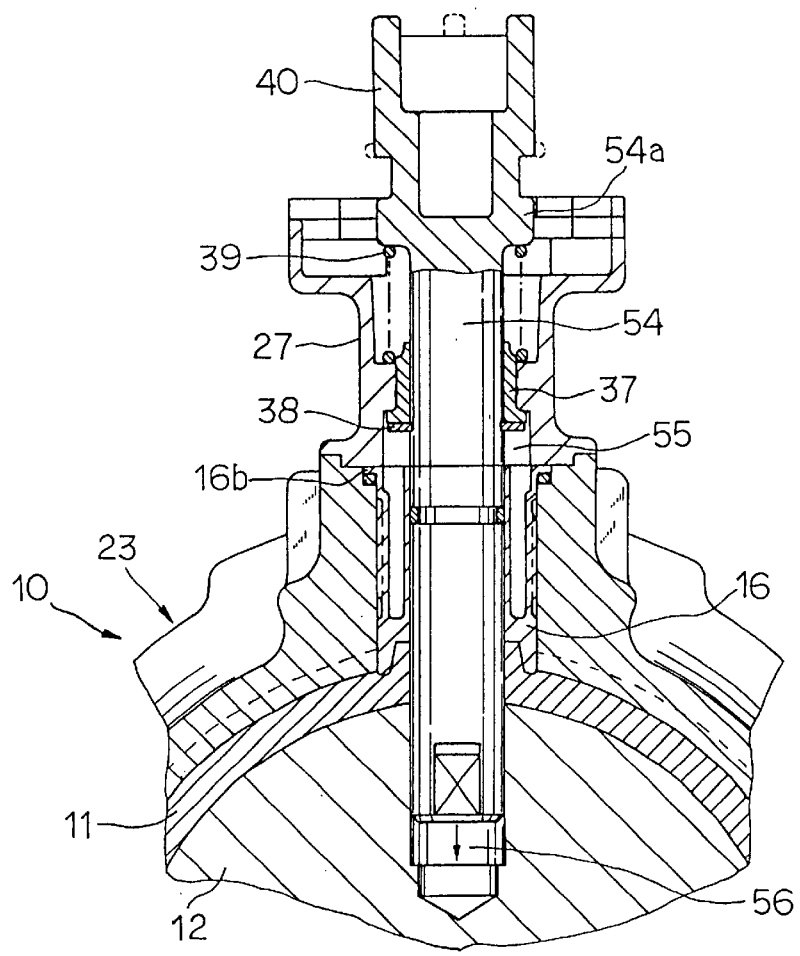
FIG. 22 is a partially cutaway, longitudinal cross section illustrating still another embodiment of the non-neck butterfly valve according to this invention.

FIG. 22 illustrates yet another embodiment of the non-neck butterfly valve according to the present invention. The operating part 40 and the stem 54 are integrated as illustrated in the diagram. This stem 54 is wholly urged in the ascending direction by the spring 39 that is disposed so as to snap between an annular part 54a raised from the outer periphery of the stem 54 and the coupling part 27. The split ring 38 fitted to the stem 54 is meshed with the lower end surface of the bearing 37 so as to prevent the upwardly urged stem 54 from slipping off.

As an empty space 56 is disposed at the fastening region between the valve body 22 and the stem 54, the stem 54 is allowed to produce a vertical motion in the main valve body 23. Reference numeral 55 represents an empty space formed in the lower part of the coupling part 27. The split ring 38 moves in this empty space 55 from the lower end surface of the bearing 37 to the upper end part of the cylindrical bearing 16. The distance of this motion is utilized as the distance for the vertical motion of the stem 54.

Now, the operation of the aforementioned embodiment of this invention will be described below.

When the butterfly valve is used as a short neck modification, as illustrated in FIG. 9, the coupling part 27 is fastened to the attaching-detaching part 15 of the main valve body 23 and the operating device 34 is fastened to the mounting part 27b.

When the butterfly valve is used as a non-neck modification, as illustrated in FIG. 14, the coupling part 27 is fastened to the attaching-detaching part 15 of the main valve body 23. The operating part 40 and engaging part 44 which are fastened to the spring 39 and upper stem 13 are fastened in the coupling part 27.

Further, when the butterfly valve is used as a long neck modification, as shown in FIG. 1, the coupling part 26 is fastened to the attaching-detaching part 15 of the main valve body 23 and the upper stem 13 is provided with an extended shaft 24. Otherwise, the long stem 25 is fitted to the main valve body 23 and the operating device 34 is fastened to the mounting part 32 of the coupling part 26 as shown in FIG. 3. Thus, this modification is completed.

The butterfly valves of such three types can be constructed to satisfy the demand and duly incorporated by fastening a corresponding component part to the attaching-detaching part 15 of the main valve body 23 that is a common component part.

The exchange among the three types of butterfly valves is accomplished. The long neck butterfly valve of FIG. 1 is assembled by fastening the long cylindrical coupling part 26 with the bolt 31 to the attaching-detaching part 15 and fitting the projected part 28 and engaging projected part 29 of the coupling part 26 to the engaging depressed part 30 of the attaching-detaching surface 15a. The coupling part 26 is consequently fastened in a state allowing no rotation. As a result, the coupling positions of the two parts have no possibility of rotating even when the coupling part 26 happens to generate a twist or a rotational torque.

Further, the operating part such as the gear operating device 34 is fastened with bolts and nuts to the mounting part 32 of the coupling part 26 and the stems 13 and 25 are coupled with the output shaft of the operating device 34.

If the upper stem 13 is provided with the extended shaft 24, the upper stem 13 can be formed as a common component part together with the main valve body 23. At the same time, the exchange between the long neck type and the short neck type or non-neck type can be attained while the valve body 23 is kept mounted on the pipe.

The exchange to the butterfly valve of the short neck modification is attained by removing the coupling part 26 and the operating device 34 by separating bolts and nuts and thereafter, fastening the short cylindrical coupling part 27 to the attaching-detaching part 15 in the same manner as described above, and fastening the operating device 34 to the coupling part 27 (refer to FIG. 9).

The exchange to the butterfly valve of the non-neck modification is accomplished, as shown in FIG. 14, by fitting the spring 39 in the inner part of the short cylindrical coupling part 27, disposing the operating part 40 at the upper end of this spring 39 and fastening the setscrew 41 to the female screw 51 formed at the upper end of the upper stem 13, thereby immobilizing the operating part 40 to the upper stem 13 and imparting a vertical snapping motion to the operating part 40 as well. Further, the exchange is completed by fastening the engaging plate 44 with a bolt 45a to the upper surface of the coupling part 27.

The rotation of this operating part 40 is initiated by removing the opening degree displaying member 49, inserting the tool 42, such as a wrench, through the opening part 48a of the cover 48, and fitting the tool 42 to the angular part 40d of the operating part 40 while depressing and rotating the depressing surface part 40e. Consequently, the disk is rotated to the fully opened or fully closed position because the operating part 40 is rotated as regulated in the range of 90° by the stopper part 46.

When the tool 42 is relieved of the depression while the disk is kept at the position for full open, full close, or intermediate open, the operating part 40 is elevated by the snapping force of the spring. As a result, the engaging projected part 40b of the operating part 40 is meshed with the engaging part of the engaging plate 44 to lock the operating part 40 infallibly. By the tool 42 imparting a rotation to the operating part 40, therefore, the motion to the position of full open, full close, or intermediate open can be produced and the operating part 40 is infallibly locked at the prescribed position.

Further, during the operation of rotating the non-neck butterfly valve illustrated in FIG. 22 in which the operating part 40 and the stem 54 are integrated, the vertical motion of the operating part 40 is allowed to lock the engaging projected part 40b of the operating part 40 with the engaging parts 44a and 44b, respectively, without inducing any jerky motion, improve the accuracy of positioning, and exalting the sealing property. Since the number of component parts is small and since the fabrication does not require high accuracy, the expenses required for the parts can be suppressed. Since the number of steps of assembly is small, the cost can be cut.

Thus, the rotary valve that meets the actual need can be selected from among the three types, i.e. long, sort, and non-neck types. Numerous sorts of variation can be promptly accommodated.

In accordance with the present invention, therefore, by modulating the main valve body as a common component part, the rotary valve that meets the need can be selected from various types, i.e. long neck, short neck, and non-neck types. This invention can promptly accommodate the need of a pipe and the environment of installation and, at the same time, allow a prominent cut in the number of component parts and contribute to the reduction of cost by forming the parts as a common component part. This invention can propose rotary valves that excel in economy.

Further, the rotary valve excels in the ability to execute fabrication because the component units other than the main valve body can be exchanged, with the main valve body kept mounted on the pipe. The coupling positions of the component parts have no possibility of inducing any deviation even when the rotary valve generates a twist or a rotational torque. Thus, the accuracy of the opening or closing motion of the rotary valve can be improved.

The long neck rotary valve particularly functions as a value for preventing formation of dew. The short neck rotary valve contributes to compaction of the valve and fits the saving of space for the pipe. The non-neck rotary valve fits the line of pipes that have low frequency of opening and closing motions and contributes to the saving of space.

What is claimed is:
1. A rotary valve kit comprising:
a main valve body including a body, a seat disposed in said body, a valve body disposed in said body, said valve body being rotatable through said seat, a stem entering said body and imparting opening and closing motions to said valve body, and an attaching-detaching part slightly projecting from said body at a position where said stem enters said body and having an upper flat fitting surface on which a plurality of threaded screw holes are formed, said main valve body being a common component part;

an operating part adapted to operate said valve body;

at least two of a first component part, a second component part, and a third component part, wherein said first component part includes a first coupling part adapted to be detachably fastened at one end to said attaching-detaching part via a baffle fitting and a screw and another end of said first coupling part being mountable on said operating part to join said attaching-detaching part and said operating part, said first coupling part having a long cylindrical shape and a flange-shaped mounting part at said another end adapted to have said operating part mounted therewith, said second component part includes a second coupling part adapted to be detachably fastened at one end to said attaching-detaching part via a baffle fitting and a screw and an another end of said second coupling part being mountable on said operating part to join said attaching-detaching part and said operating part, said second coupling part having a short cylindrical shape and a flange-shaped mounting part at said another end adapted to have said operating part mounted therewith, said third component part includes a third coupling part having a short cylindrical shape and adapted to be detachably fastened at one end to said attaching-detaching part via a baffle fitting and a screw adapted to accommodate said stem thereon, said third coupling part being adapted to allow motion of said operating part therein along a length of said third coupling part, wherein an outer periphery of said stem and an inner periphery of said third coupling part form an empty part, a spring being disposable between said operating part and said third coupling part, said spring being adapted to urge said operating part to a position away from said main valve body within said third coupling part, a stopper part disposed in the empty part and adapted to form a rotation restricting area for said operating part, and an engaging part disposed in the empty part and adapted to lock said valve body in one of a wholly open, a wholly closed, and an intermediate open position, and wherein said rotary valve kit selectively constitutes a long-neck rotary valve when said first component part is combined with said main valve body and said operating part, a short-neck rotary valve when said second component part is combined with said main valve body and said operating part, and a non-neck rotary valve when said third component part is combined with said main valve body and said operating part.

2. A rotary valve kit according to claim 1, wherein said at least two of said first component part, said second component part, and said third component part is one of each of said first component part, said second component part, and said third component part.

* * * * *